United States Patent
Zayas et al.

(10) Patent No.: US 7,145,740 B2
(45) Date of Patent: *Dec. 5, 2006

(54) METHOD FOR CONSTRAINED IMPLEMENTATION OF VARIABLE DATA TPI

(75) Inventors: Fernando A. Zayas, Loveland, CO (US); Patrick Allen Hery, San Jose, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 329 days.

This patent is subject to a terminal disclaimer.

(21) Appl. No.: 10/387,789

(22) Filed: Mar. 13, 2003

(65) Prior Publication Data

US 2004/0179292 A1 Sep. 16, 2004

(51) Int. Cl.
*G11B 27/36* (2006.01)
*G11B 5/09* (2006.01)
(52) U.S. Cl. .......................................... 360/48; 360/31
(58) Field of Classification Search ................. 360/48, 360/51, 53, 75, 31
See application file for complete search history.

(56) References Cited

U.S. PATENT DOCUMENTS

| | | | |
|---|---|---|---|
| 5,930,069 A | 7/1999 | Kim | |
| 5,940,237 A | 8/1999 | Takagi | |
| 6,091,559 A * | 7/2000 | Emo et al. | 360/48 |
| 6,256,160 B1 * | 7/2001 | Liikanen et al. | 360/48 |
| 6,437,947 B1 | 8/2002 | Uno | |
| 6,466,387 B1 * | 10/2002 | Ogasawara et al. | 360/48 |
| 6,724,562 B1 | 4/2004 | Ang et al. | |
| 6,765,737 B1 | 7/2004 | Lim et al. | |

* cited by examiner

*Primary Examiner*—David Hudspeth
*Assistant Examiner*—Glenda P. Rodriguez
(74) *Attorney, Agent, or Firm*—Fliesler Meyer LLP (57) ABSTRACT

The present invention comprises an implementation of a variable data TPI hard drive system. In one embodiment, the system is implemented by configuring a group of servo tracks in a radial direction for a hard drive media. The group is comprised of an integral number of servo tracks that is constant throughout the drive device. The number of data tracks in a group is also an integer but will vary for each surface according to the head used for R/W operations for each media surface. Group boundaries coincide with media surface R/W zone boundaries. The groups are accessed in hard drives having multiple surfaces in a serpentine manner. Data tracks per group are reduced from what is achievable to produce desired target capacities.

18 Claims, 10 Drawing Sheets

METHOD FOR CONSTRAINED IMPLEMENTATION OF VARIABLE DATA TPI

CROSS REFERENCE TO RELATED APPLICATIONS

The present application is related to the following United States Patents and Patent Applications, which patents/applications are assigned to the owner of the present invention, and which patents/applications are incorporated by reference herein in their entirety: U.S. patent application Ser. No. 10/387,781, entitled "A CONSTRAINED IMPLEMENTATION OF VARIABLE DATA TPI," filed on Mar. 13, 2003, currently pending.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The current invention relates generally to reading and writing to an electronic storage device having at least one recording surface, and more particularly to reading and writing to an electronic storage device having at least one recording surface using a variable data track per inch format.

2. Background of the Invention

Figure 1A:
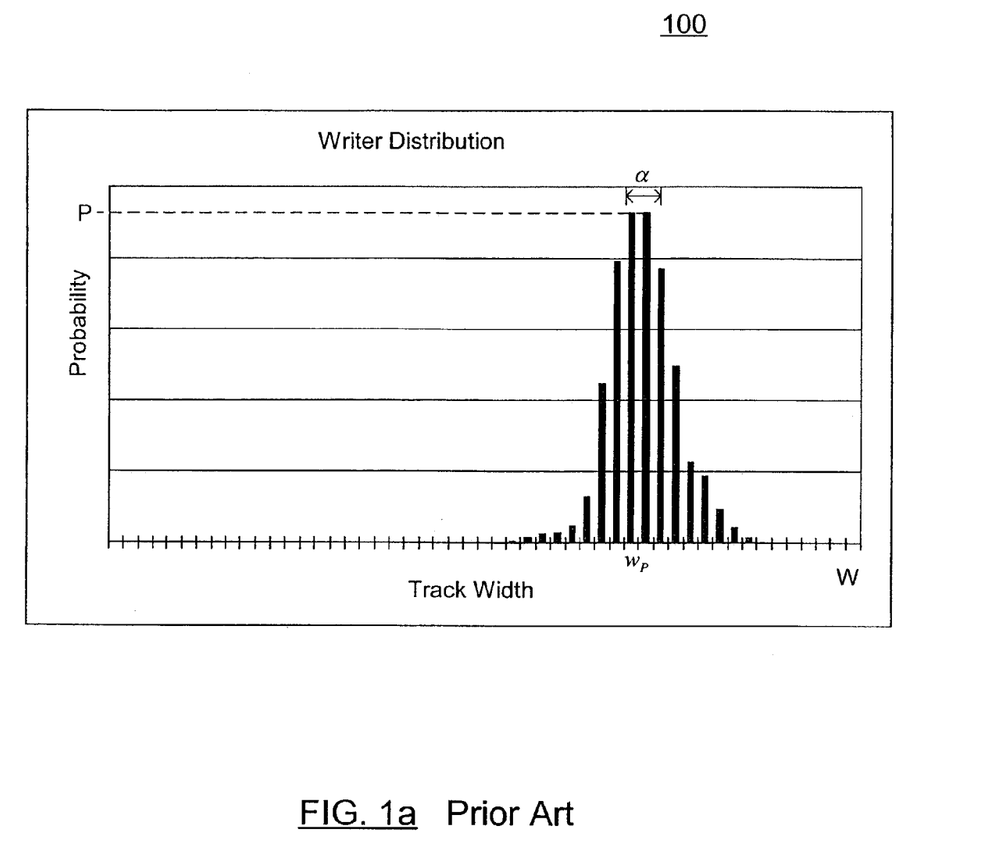
FIG. 1a is an illustration of a distribution of head writer widths acceptable for hard disk drive write/read use in the prior art.

With the advances in disk drive technology, the geometry of magnetic recording heads and corresponding data track pitch is continually becoming smaller. As the heads become smaller, the acceptable range of a head's writer width that can be used for a hard disk media surface with a static data track per inch (TPI) format becomes smaller as well. Thus, controlling the writer width to within a percentage tolerance becomes increasingly more difficult. As illustrated in FIG. 1a, a distribution 100 of typically available head writer width versus the probability of the available heads being acceptable for use in a hard drive is illustrated in FIG. 1a. As head writer widths vary from 0 to W, the probability $\rho$ that a head will be acceptable within a hard drive attains a maximum probability P at head width $w_p$. Usable heads have a width within a range of $\alpha$, which contains the width having the highest probability. As illustrated in FIG. 1a, a range $\alpha$ of acceptable writer widths in a hard drive with a constant track per inch format exists around $w_p$. Typically, the range $\alpha$ of acceptable writer widths is small, thereby limiting the number of manufactured heads that can be used in modern hard drives.

Figure 1B:
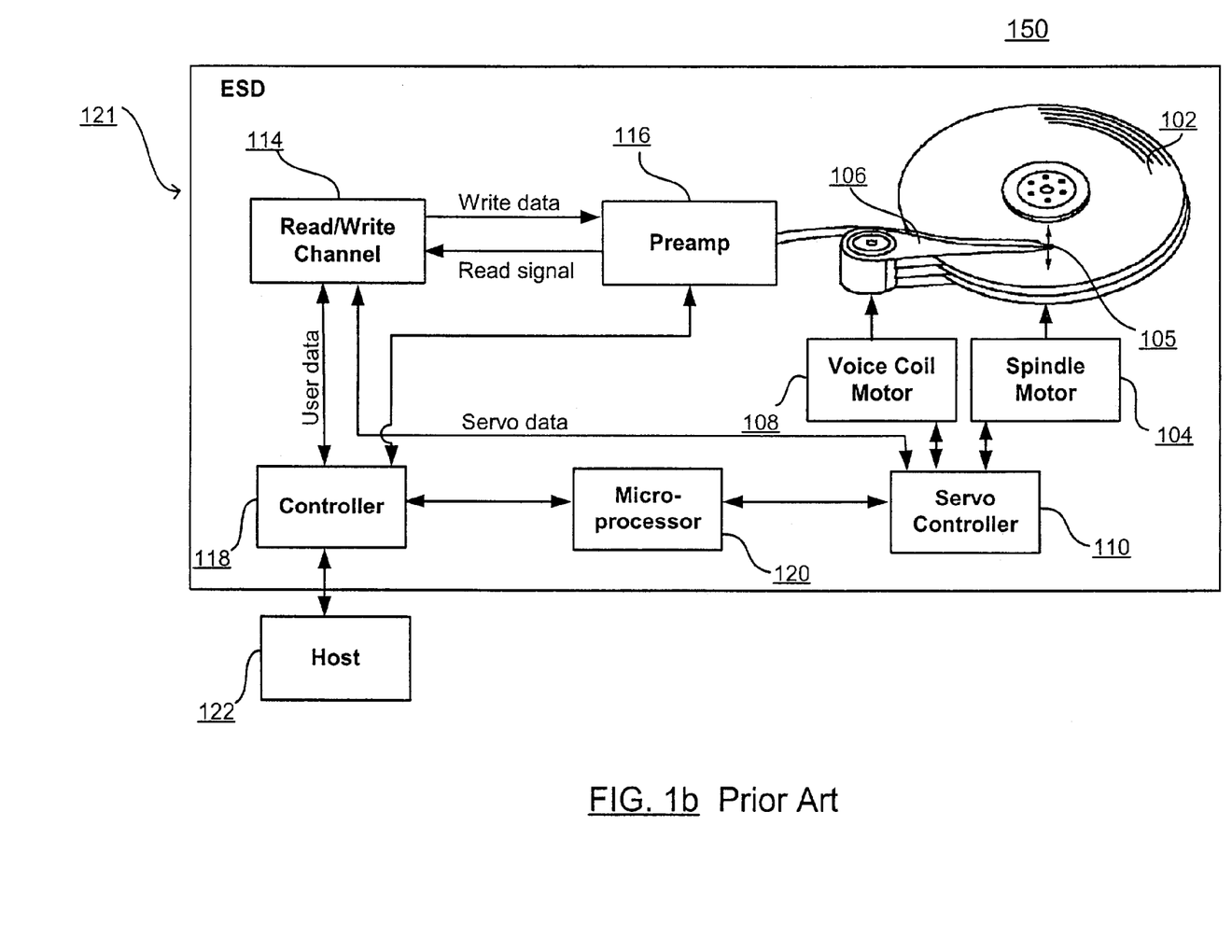
FIG. 1b is an illustration a hard drive system in accordance with the prior art.

A hard drive system 150 in accordance with one embodiment of the prior art is shown in FIG. 1b. Hard drive system 150 includes a hard drive 121 with parts including a disk controller 118, microprocessor 120, servo controller 110, read/write channel 114, a preamp 116, voice coil motor 108, spindle motor 104, actuator 106, head 105 and disks 102. Hard drive 121 may send and receive information with host(s) 122. In a standard data write operation, data write information is received from host 122 by the disk controller 118. The data to be written is sent by the disk controller to read/write channel 114 and data write instructions are sent to microprocessor 120. The microprocessor sends a signal to the servo controller. The servo controller then sends signals to the voice coil motor 108 to position actuator 106 to the data track and sector of disk 102 to which the data is to be written. Once the data track and sector are selected and the head is aligned with the desired data track, a signal from the servo controller to the read/write channel, in one embodiment, enables a data write operation through the preamp 116 to the disk 102. Throughout write operations and similarly executed read operations, the spacing between data tracks is uniform.

Variable data TPI hard drive systems where data and servo TPI are chosen arbitrarily have been slow to evolve because they involve complicated software and mathematical processes. For this reason, variable data TPI methods are not very well developed in the electronic storage device industry. What is needed is a variable data TPI system and method that overcomes the limitations and disadvantages of the prior art.

SUMMARY OF THE INVENTION

The present invention comprises an implementation of a variable data TPI hard drive system. In one embodiment, the system is implemented by configuring a group of servo tracks in a radial direction for a hard drive media surface or surfaces. The group is comprised of an integral number of servo tracks that is constant throughout the drive device. The number of data tracks in a group is also an integer but may vary for each surface according to the head used for R/W operations for the media surface. Group boundaries coincide with media surface R/W zone boundaries. The groups on multiple disk surfaces are accessed in a serpentine pattern.

DETAILED DESCRIPTION

The present invention comprises an implementation of a variable data TPI hard drive system. In one embodiment, the system is implemented by configuring a group of servo tracks in a radial direction for a hard drive media. The group is comprised of an integral number of servo tracks that is constant throughout the drive device. The number of data tracks in a group is also an integer but will vary for each surface according to the head used for R/W operations for each media surface. Media surface R/W zone boundaries are placed on group boundaries. The groups are accessed in hard drives having multiple surfaces in a serpentine manner. If the serpentine access extends across groups, the serpentine switches surfaces at group boundaries.

Figure 2:
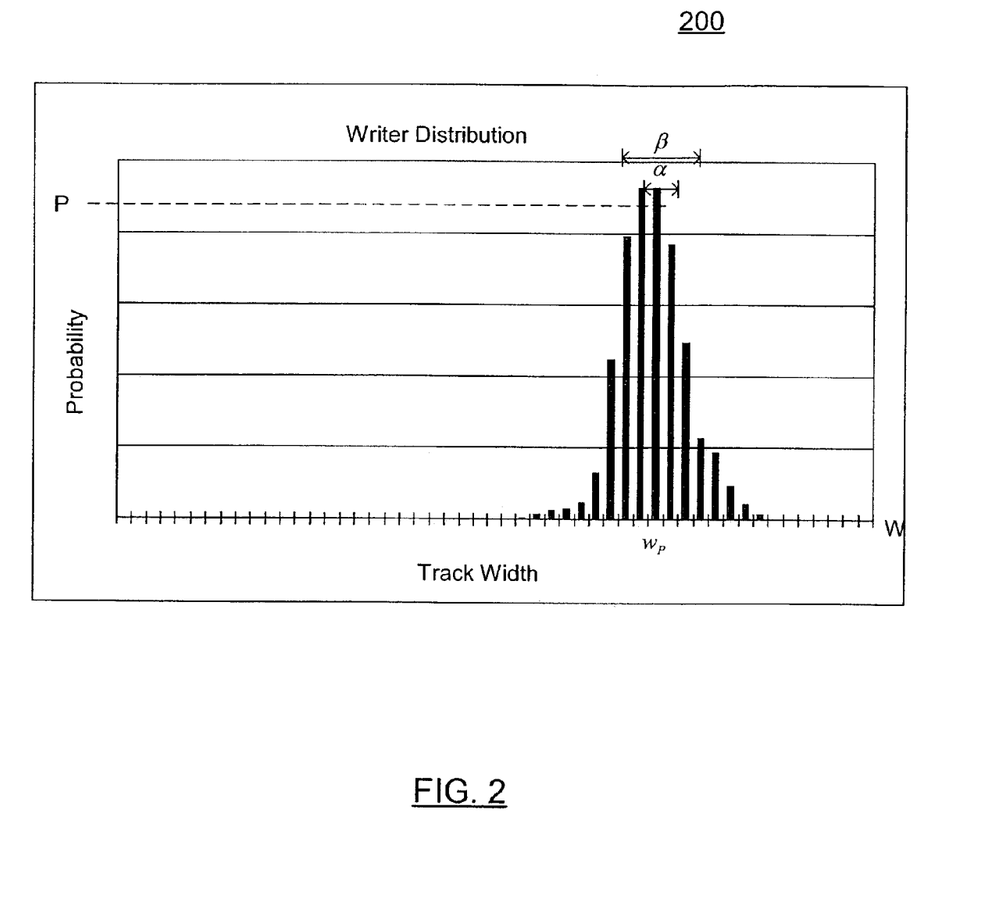
FIG. 2 is an illustration of a distribution of head writer widths acceptable for hard disk drive write/read use in accordance with one embodiment of the present invention.

The variable data TPI implementation of the present invention allows for data tracks to be located at a different spacing for different disk surfaces. Alternatively, the variable data TPI implementation of the present invention allows for different capacities of essentially the same model hard drive based on the single head's writer width. This provides for heads having a broader range of widths to be used in a hard drive. Since different head widths may be implemented for use with different disk surfaces, heads that normally couldn't be used for a drive may be used. A drive that can use a broader range of head widths allows a larger population of the head pool to be used in drive manufacturing. As shown in distribution 200 illustrated in FIG. 2 and discussed above, the range α of acceptable head writer widths for a drive that requires a generally uniform head width is small. In accordance with the present invention, a wider range β of head writers can be used in manufacturing of hard disk drives. In this case, a larger range β of acceptable writer widths exists around $w_p$.

Figure 3:
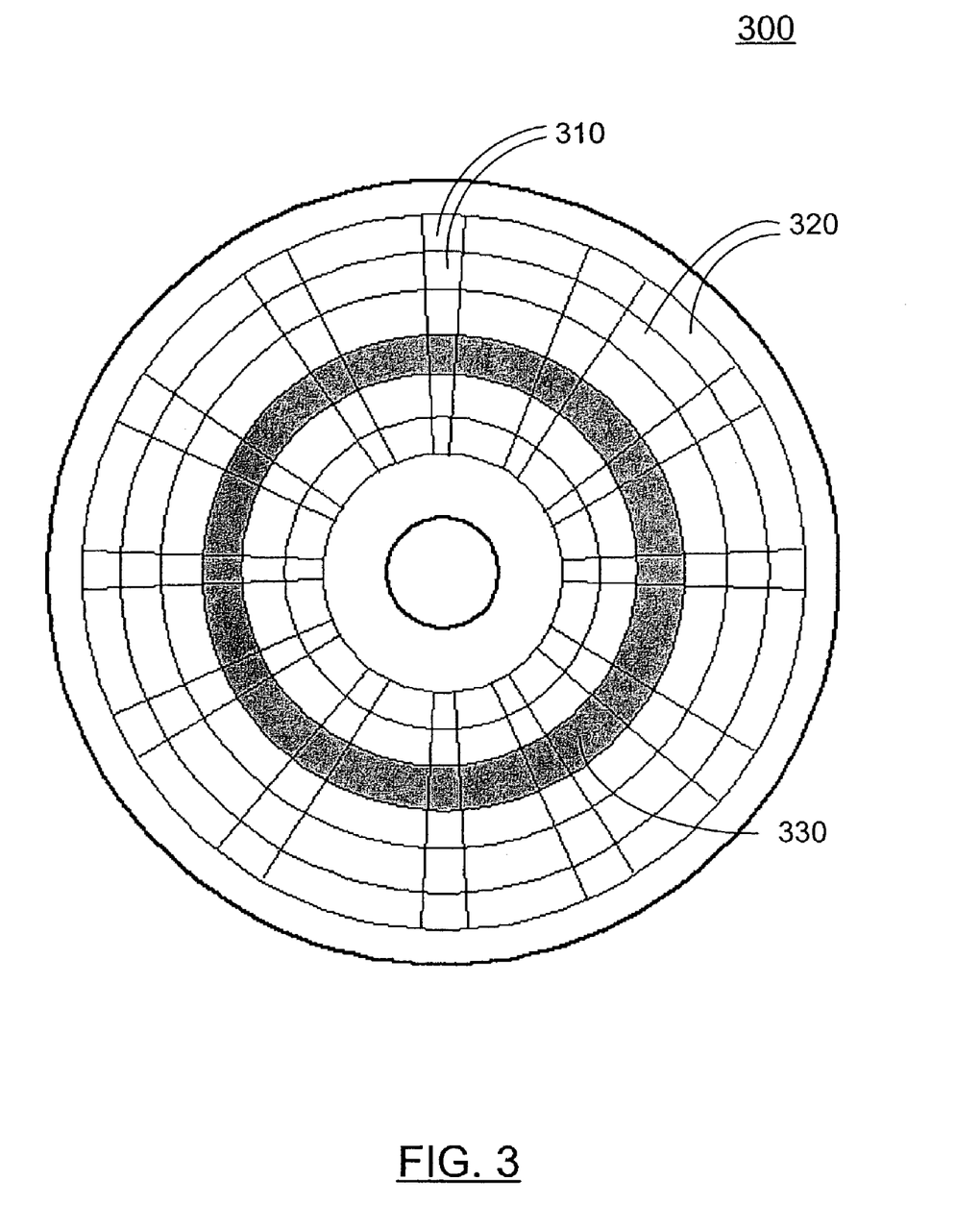
FIG. 3 is an illustration of a representative sector map of a hard disk surface in accordance with one embodiment of the present invention.

As is known by those in the art, a hard drive disk surface is divided into data sectors and servo wedges that together comprise concentric tracks. FIG. 3 is an illustration of a sector map of a hard disk surface 300. FIG. 3 is intended to represent a simplified model of a hard disk sector map and not represent a sector map required for use with the present invention. Sector map 300 includes servo wedges 310 and data sectors 320. As shown in FIG. 3, data sectors are separated by servo wedges. A servo wedge contains servo information and may be used to position the head in preparation for accessing a data sector location. A set of adjacent data sectors and servo wedges form a concentric track, as shown by shaded track 330. Generally, the space between servo wedges is used for data. It may contain less than one, one, or more than one data sector. In one embodiment, servo wedges have a pitch (the servo track pitch) that is finer than the pitch of data tracks. For example, to access data track 5000, the drive circuitry does so (after extensive calculations) by seeking to servo track 7803.42.

Figure 4:
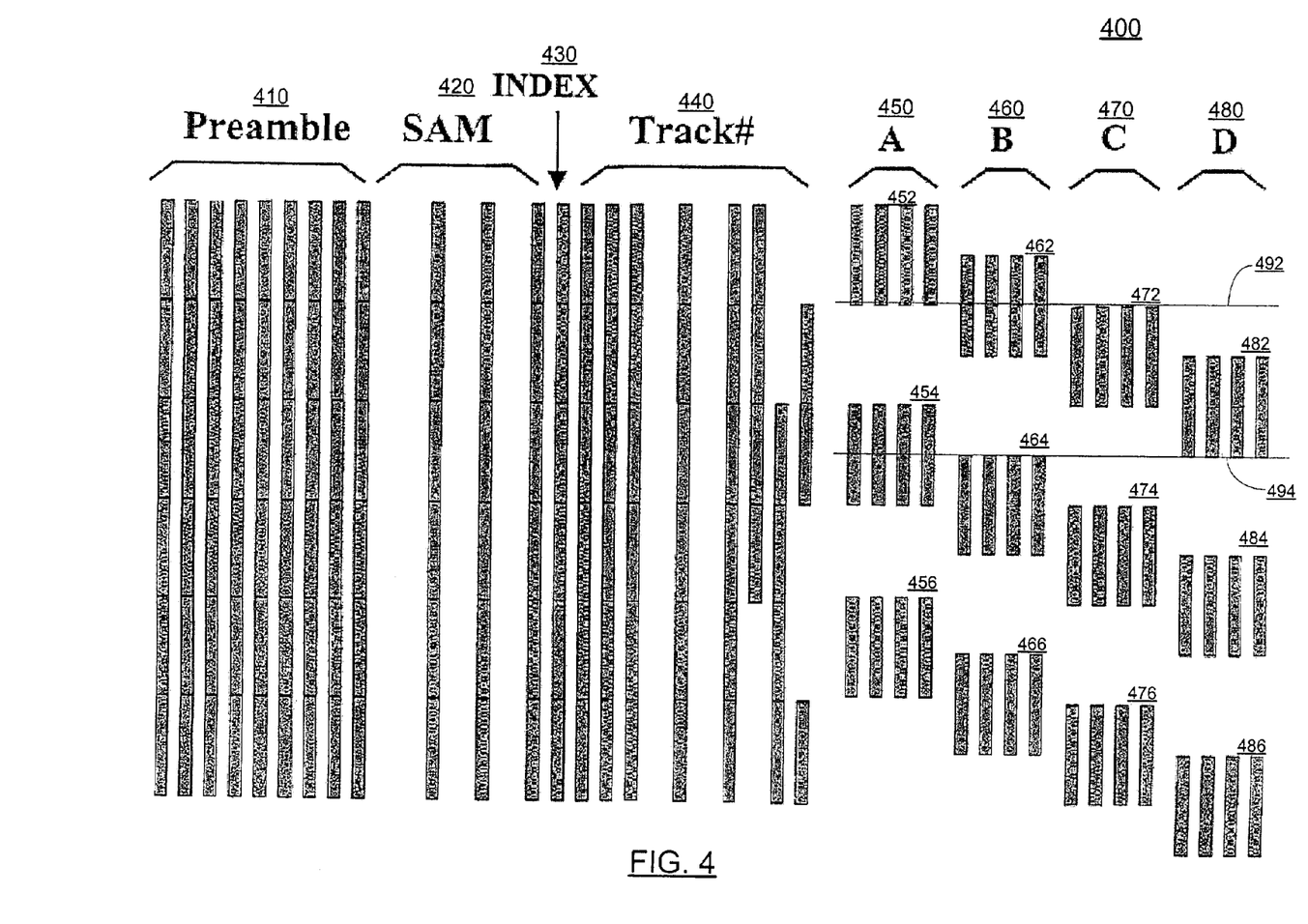
FIG. 4 is an illustration of servo information on a hard disk surface in accordance with one embodiment of the present invention.

An illustration of a servo information pattern 400 on a hard disk surface in accordance with one embodiment of the present invention is shown in FIG. 4. As shown, the servo wedge information pattern 400 includes preamble information 410, SAM information 420, index information 430, track identification information 440, and burst information 450, 460, 470, and 480. Burst information includes servo bursts 452, 454, 456, 462, 464, 466, 472, 474, 476, 482, 484 and 486.

Servo bursts are used to align a head on designated data tracks. In a standard three pass track servo write method, three passes are made per data track to lay down the burst information used to align a head with data tracks which are evenly spaced every one and half servo bursts. Thus, as illustrated in FIG. 4, data track 492 is aligned along the lower edge of servo burst 452 and the upper edge of servo burst 472. For a head to align with data track 494, the read sensor is positioned so that it reads equal amplitudes of bursts 482 and 464. This servo write technique, having 1 data track per 1.5 servo tracks, and the method of aligning heads over data tracks are well known to those in the art.

Figure 5:
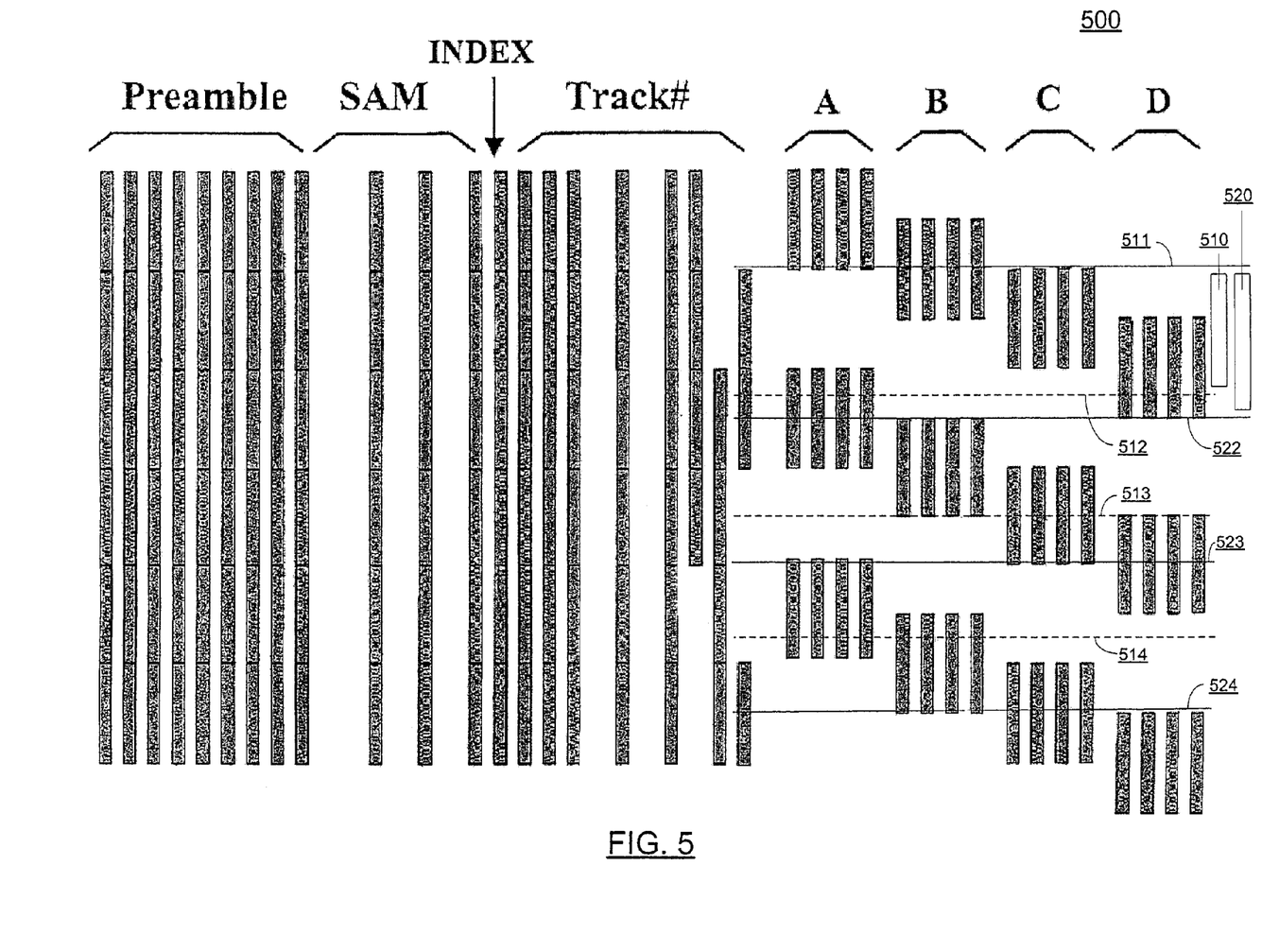
FIG. 5 is an illustration of superimposed servo and data track information for two hard disk surfaces having different head writer widths in accordance with one embodiment of the present invention.

Heads having different writer widths are best suited to access data tracks spaced at different intervals. Thus, for heads having different writer width, the data track spacing should be different. Two superimposed media surface servo information patterns with corresponding data tracks that correspond to different heads in accordance with the present invention are illustrated in FIG. 5. FIG. 5 may be thought of as a see-through top view of a media surface having a different data TPI format for the upper and lower surfaces. In one embodiment, the servo bursts will possess similar alignment locations for both media surfaces. In another embodiment where servo tracks are not sufficiently aligned between ESD surfaces, an offset may be incorporated when converting from physical tracks on the surface to logical tracks processed by the ESD circuitry. Data track spacing will differ for each media surface according to the width of the head's writer used to access that surface.

Writer head width and the optimal data track pitch that the writer head can write to may be determined in many ways. In one embodiment, writer width is determined by detecting the resolution of data tracks the writer is capable of writing to. First, a band of data tracks is erased. Next, one data track is written near the middle of the band using the writer head to be measured. The read head may then pass through the band servo tracks to look for the written data track. As the read head approaches, reads, and then leaves the data track written, signals having ramping, maximum, and then decreasing amplitudes will be detected. By analyzing the range of signals detected and comparing them to the servo tracks at which they were detected, the writer width may be determined.

In another embodiment, the optimal track pitch can be selected from a list of possible track pitches. In this method, groups of three adjacent tracks are written at each of the proposed track pitches. Once written, the signal quality of the center track of each group is measured. Groups that are written with a track pitch that is too narrow for the particular reader/writer combination of a head will have either a higher error-rate or a lower signal quality on the center track. The selected track pitch can be the narrowest proposed pitch for which the error-rate or signal quality are acceptable. Alternatively, the track pitch can be selected to be some amount larger than the above-mentioned narrowest proposed pitch that delivers an acceptable error-rate or signal quality (in order to provide design margin).This is one example of many methods for determining writer width and track pitch that may be used with the present invention. Other methods as known in the field may be used and are considered within the scope of the present invention.

As shown in FIG. 5, head writer 510 corresponds to a first media surface with data tracks positioned at lines 511, 512, 513 and 514. Head writer 520 corresponds to a second surface with data tracks positioned at lines 511, 522, 523 and 524. Though the servo burst spacing remains the same for both surfaces, the data tracks associated with the first head 510 are spaced closer together than the tracks associated with the second head 520. In particular, the writer width of the first head 510 is smaller than head writer 520 and requires less spacing between its corresponding data tracks. In one embodiment, data tracks may be configured to reside at a resolution of up to one quarter of a servo burst width. However, the variable data track per inch implementation of the present invention may be used at higher resolutions. The exact data track per inch and data track per servo burst ratio will depend on the width of the head writer used to access the disk surface. In previous ESDs, a servo burst is typically two thirds of the track pitch in radial extent. In one embodiment of the present invention, the head writer of the present invention may be as much as one third smaller than a nominal head writer. In one embodiment of the present invention, the writer head width can vary from about seventy percent of the nominal data track pitch to over 110% of nominal data track pitch, wherein the nominal track pitch is the distance between the centers of two adjacent data tracks. However, the variable data track per inch implementation of the present invention may be used at larger variations of writer head width in terms of nominal data track pitch. The reader head width can be sixty percent of the track pitch, plus or minus twenty percent. In one embodiment, the reader head width should not be greater than the writer head width. In another embodiment, the reader head width may be narrower than the writer head width by an amount of at least ten percent of the track pitch.

Figure 6:
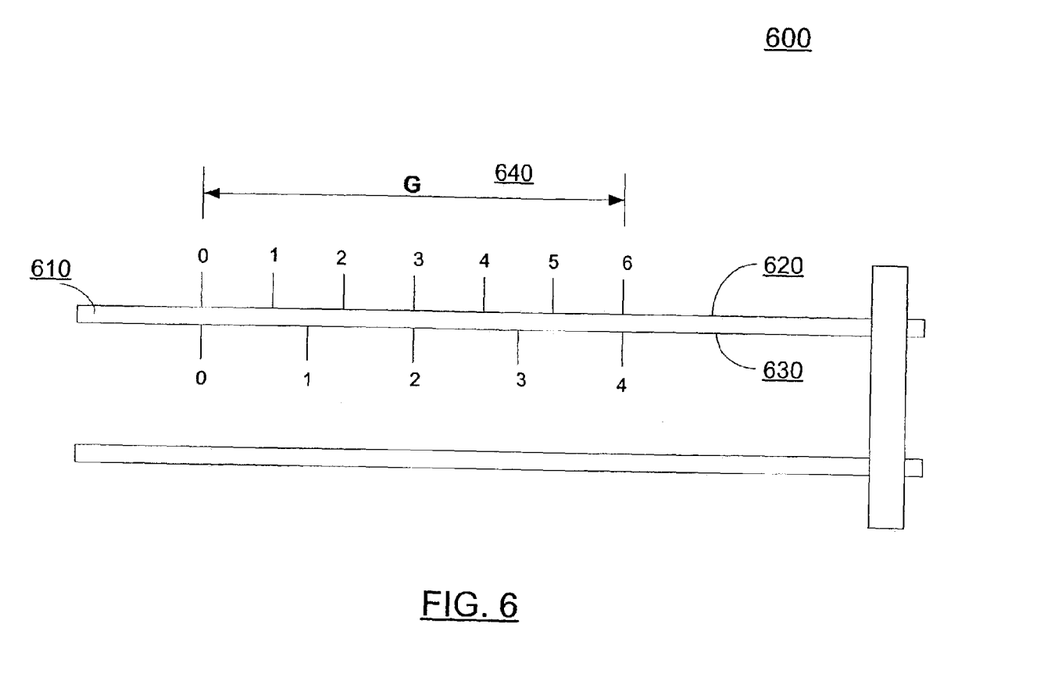
FIG. 6 is an illustration of a side view of a hard disk having different data TPI for each surface in accordance with one embodiment of the present invention.

FIG. 6 illustrates a side view of a hard drive disk 610 having different data TPI for an upper and lower surface in accordance with one embodiment of the present invention. In the embodiment shown, disk 610 has an upper surface 620 and lower surface 630. A group 640 is configured in roughly the same physical location on the upper and lower surface of a disk. The group is configured in the same general location, and having the same boundaries, on other disk surfaces within the hard drive as well (not shown). Upper surface 620 contains six data tracks within group 640. Lower surface 630 contains four data tracks within group 640. Thus, a group contains an integral number of data tracks that are constant over a surface of a disk, but will vary between different disk surfaces within a hard drive.

The size of a group is subject to several constraints. In one embodiment, as discussed above, a group size must be made up of an integral number of servo tracks. Thus, a group should be chosen such that an integral number of consecutive servo tracks can be placed within the group. The number of servo tracks within a group will be uniform throughout all surfaces in a hard drive. In another embodiment, group size must be selected such that an integral number of data tracks exist within a group. The number of data tracks is uniform per group per surface, but may vary between surfaces as the head writer width varies per surface. In another embodiment, R/W zone boundaries coincide with a group boundaries on each disk surface. Thus, a smaller group size may be advantageous in that it would provide for a higher resolution in placing R/W zone boundaries at group boundaries. Typically, there are more group boundaries per surface than media zone boundaries. In one embodiment, a disk surface may have between sixteen to twenty four media zones. A disk surface may have up to thousands of groups, depending on the disk surface TPI. In any case, a group may consist of any number of servo tracks. In one embodiment, a group consists of between 15 and 480 servo tracks.

Figure 7A:
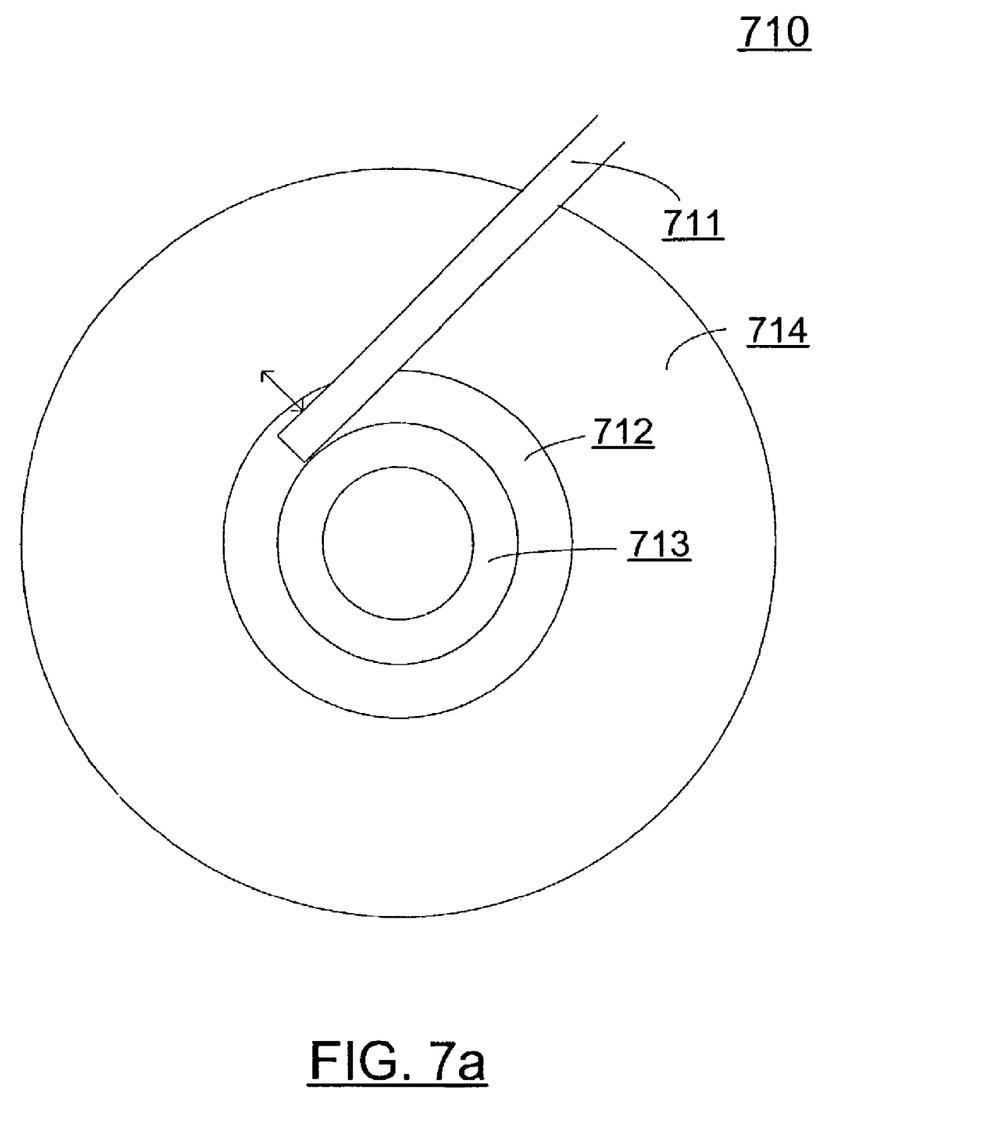
FIG. 7a is an illustration of a top view of a hard disk surface used in serpentine R/W in accordance with one embodiment of the present invention.

In one embodiment of the present invention, head movement during sequential accesses to data sectors is done in a serpentine fashion within a group or an integral number of groups. FIG. 7a illustrates a simplified top view of a hard drive disk surface 714 having groups 712 and 713 and an arm mechanism 711. In accordance with one embodiment of the present invention, sequential accesses in a serpentine format involves arm 711 traversing group 712 in one direction on the upper surface 714. Next, the controller switches to the next surface and an arm corresponding to the next surface traverses group 712 in the opposite direction of the first traverse. This process continues for all surfaces that are used for data storage. If the sequential accesses continue beyond all surfaces of group 712, the controller starts the process with group 713, but begins on the last surface accessed with group 712. In this manner, the head travels radially in a direction towards (or away from) the center of a disk surface as the disk spins to provide access to data sectors within the data tracks of a group.

Figure 7B:
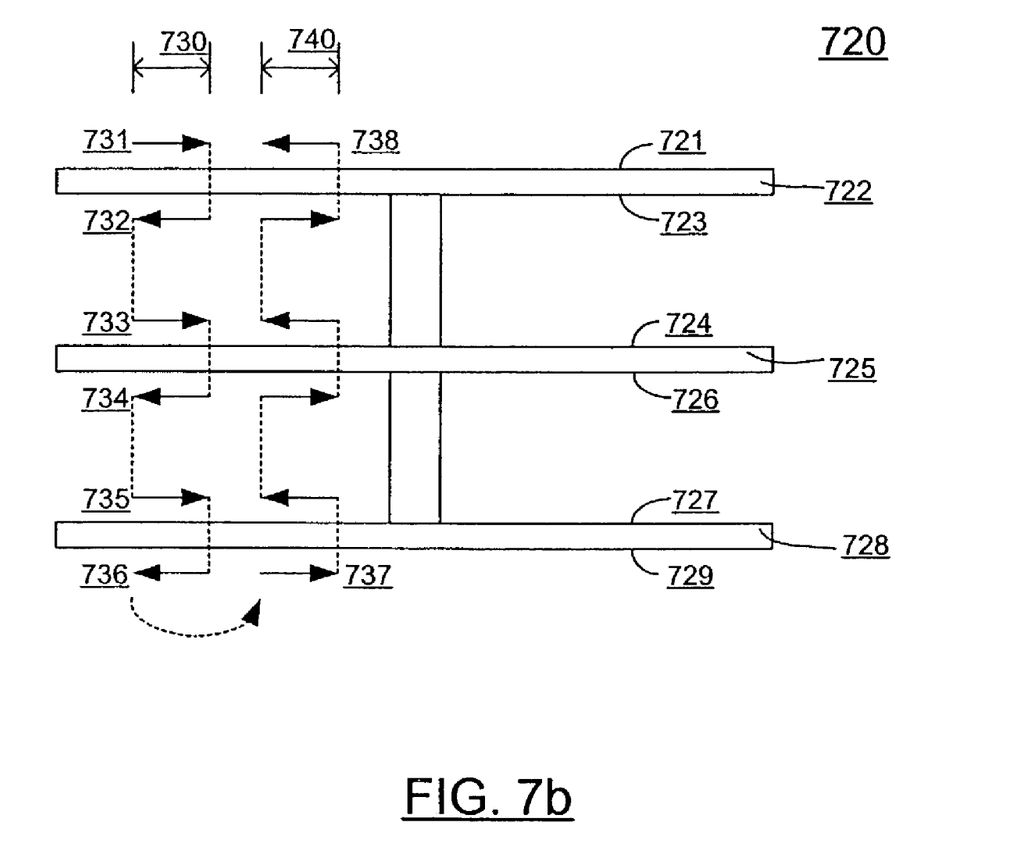
FIG. 7b is an illustration of a side view of a hard disk surface used in serpentine R/W in accordance with one embodiment of the present invention.

FIG. 7b illustrates a side view of hard drive disk surfaces 720 used in serpentine R/W operations in accordance with one embodiment of the present invention. The elements of FIG. 7b include hard drive disks 722, 725, and 728, and disk surfaces 721, 723, 724, 726, 727 and 729. Heads and other hardware are not shown for purposes of simplifying the illustration. A serpentine pattern of R/W operation is shown by R/W directional arrows 731, 732, 733, 734, 735 and 736 over a group area 730. In one embodiment, a first R/W operation is performed along disk surface 721 in the direction of directional arrow 731 Once the R/W operation has spanned the entire group 730 having an integral number of data tracks on surface 721, the R/W operation continues upon disk surface 723. The last data track accessed in direction 731 is located approximately opposite to the first data track accessed in direction 732. This provides for minimal head movement in accessing data from consecutive tracks located on different disk surfaces. Compensation for very different servo track alignment as can be caused by writing servo information before assembly or insertion into a drive is not shown, but is well understood by those in the art. As shown, the R/W operation on disk surface 723 occurs over the same configured group 730 but in a direction 732 that is opposite of direction 731 of the R/W operation on surface 721. Once the R/W operation on surface 723 is completed for the group 730, R/W operation continues upon disk surface 724 of disk 725. As shown, the direction 733 of the R/W operation on surface 724 is the same as that on 721 but opposite that of 732. The R/W operation continues in this manner for the remainder of the surfaces in the drive as shown in FIG. 7b from directional arrow 731 to directional arrow 736. Once the last surface of the last disk is read, the next group may be accessed if further read or write operations are to be performed. In the embodiment illustrated in FIG. 7b, the next group 740 is accessed along directional arrows 737 to 738. Thus, after the group is accessed along directional arrow 736, the head will move on the same surface to read or write along adjacent direction arrow 737 of group 740. Operation continues as it did for group 730 along the media surfaces until the head travels along the upper surface 721 in direction indicated by directional arrow 738. The process may be repeated for multiple groups as needed. For a hard disk drive accessed in a serpentine fashion, consecutively accessed sector locations are configured to be consecutive logical memory locations. Compensation for defects is not shown but is well understood by those in the art. This method of accessing memory locations over multiple disk surfaces reduces the time to access data tracks located on different surfaces and preserves the expectation of a "cylinder of tracks" and the expectation that lower addressed blocks on the disk exist on higher capacity tracks than those blocks at higher addresses (the concept of zoning).

In implementing variable data TPI in accordance with one embodiment of the present invention, configurations are implemented that differ from typical implementations of the prior art. In one embodiment, configuring R/W parameters for variable data TPI differs in the present invention from the prior art. In prior art, setting up the R/W parameters for a zone has typically only required a data track as input, for example: SetupForZone (dataTrack). To set up the zone parameters in one embodiment of the present invention, the zone information is also dependent on the head. This results in a call that may read: SetupForZone (dataTrack, head). In another embodiment, zone tables are addressed by a table of zone pointers kept per head. A zone table contains information regarding zone boundaries for the a particular surface such as the number of servo tracks per zone boundary (or stated in the terminology of the present invention, number of groups per zone), the frequency configured for reading and writing data and other zone information. Using zone pointers for each head allows zone tables to be shared between heads while only the tables of pointers are unique for each head.

Translating data track to servo track in a typical ESD in the prior art is simple, usually calculated by multiplying the data track number by a constant multiple of 1.5 or (3*dataTrack)/2. This translation is required in order to communicate to the servo subsystem how to align with a subsequent data track. In one embodiment of the present invention, the multiple to derive data track from servo tracks is a variable. If the variable data tracks per servo track is stored in qX1 (that is, with qX1 places to the right of the decimal point), the following expression converts data tracks into servo tracks in qX1 format: (dataTracksPerServoTracks[head]*dataTrack)//Result in qX1.

Once R/W parameters were set up for a zone, the code in the ESD of a typical prior art system does not address or monitor subsequent zone crossing during sequential transfers until the zone's highest data track is surpassed by the head. In one embodiment of the present invention, any time the end of the group is reached and there is more than one surface, a head switch and a zone crossing occur as the R/W parameters, such as data frequency, will typically differ from surface to surface. Stated another way, in this invention each group or series of groups is a zone cross, at whichever point the attempted head switch occurs if the drive has multiple surfaces.

In one embodiment, the R/W control components such as the disk controller, microprocessor and servo controller of a hard drive of the present invention are configured with information to implement a constrained variable TPI hard drive in accordance with one embodiment of the present invention. The information may include the number of surfaces, group size in servo tracks, and number of data tracks per servo track to implement per disk surface. Configured with at least this information, a hard drive system of the present invention can be configured to implement the variable data TPI as discussed herein.

As discussed above with regard to the size of a group, a smaller group size gives the most flexibility in placing zone boundaries. However, a larger group size makes the adjustment for writer width have more granularity and improves the performance of the ESD up to a point. The improved performance occurs because for every head switch, a time and processing overhead occurs in order to look up and reload the R/W parameters. In one embodiment, a starting point of 192 servo tracks per group (nominally 128 data tracks) may be chosen, assuming a 4-burst, 3-pass per track format. If the writer width is varied up twenty-five percent above and below the nominal width, a surface with 100 to 160 data tracks per group results. In one embodiment, R/W zones consist of between 24 and 40 groups between media zone boundaries. In another embodiment, R/W zones consist of 32 groups spanning 4096 (nominal) data tracks.

Figure 8:
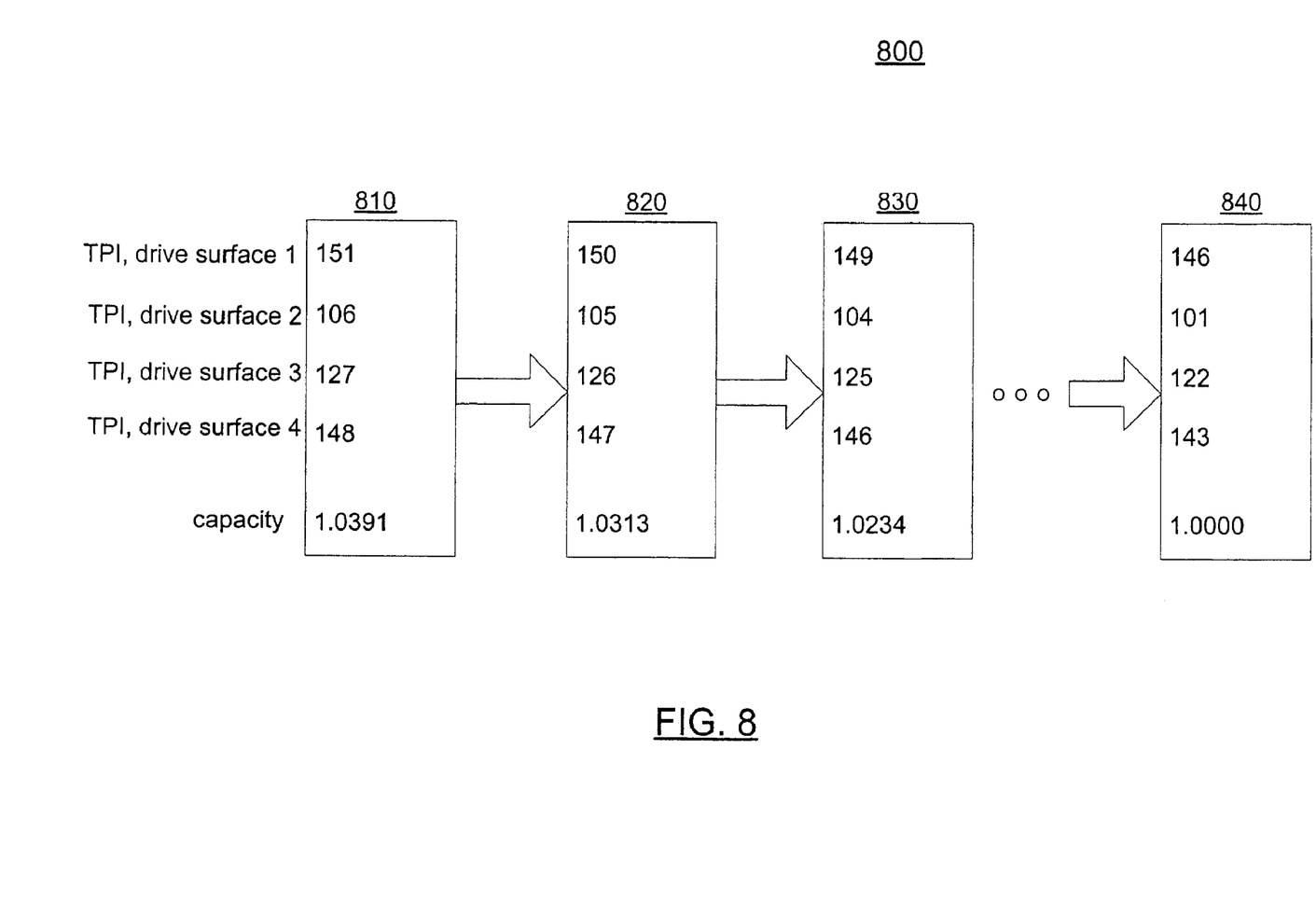
FIG. 8 is an illustration of a method for representing data track reduction to establish goal capacities in accordance with one embodiment of the present invention.

In one embodiment, once writer width and the corresponding data tracks per group have been determined for the surfaces of a storage device, a reduction method may be used to achieve specific capacity targets. A desired ESD capacity may be set to some capacity that is marketable or otherwise desired. A resulting capacity of the ESD corresponds to the actual capacity of the ESD with a particular value of data tracks per group implemented. Because of market requirements, not all possible resulting capacities are desirable. In one embodiment, the reduction method reduces each surfaces data tracks per group by one until a minimum value resulting capacity is reached that is larger than the desired capacity. The remaining "extra" capacity is consumed by spares for factory detected and grown defects or other utility. This reduction method has the added benefit of providing margin, similar to making wider highways with additional lanes for cars of a given width. For purposes of illustration, consider the following example with reference to FIG. 8. Assume a group is 192 servo tracks and a nominal writer width yields 128 data tracks per group. After determining writer widths for a 4 surface drive, the reduction as illustrated in FIG. 8 is applied to the data tracks/group for each head. If the resulting capacity point is less than 1× of the desired capacity, the same reduction is applied until a capacity point is reached that is marketable. For example, a starting capacity of 0.82 may be reduced to 0.75 because it has been determined that an 80 GB per disk 2.5" drive is marketable and a 60 GB per disk 2.5" drive is marketable, but interim capacities are not (in this example, a capacity of 65.6 GB per disk). Likewise, capacity points significantly above 1× may be selected as target points (for example 1.13×90 GB and 1.25×100 GB per 2.5" disk)

The present invention comprises an implementation of a variable data TPI hard drive system. In one embodiment, the system is implemented by configuring a group of servo tracks in a radial direction of a hard drive media. The group is comprised of an integral number of servo tracks that is constant throughout the drive device. The number of data tracks in a group is also an integer but will vary for each surface according to the head used for R/W operations for each media surface. R/W zone boundaries are placed at group boundaries. The groups are accessed in hard drives having multiple surfaces in a serpentine manner. In one embodiment, target capacities are reached by reducing data tracks per group until a minimum is found that is still greater than the target capacity.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. For example, this invention also applies to a hard drive having a single surface where all instances of a particular design have capacity varying according to the writer width of the head it was built with. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical disks, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, implementing variable data TPI R/W operation in a hard drive.

What is claimed is:

1. A method for providing a differing data track pitch per surface of an electronic storage device, the electronic storage device having a plurality of media surfaces, the method comprising:
configuring a plurality of groups, each group having a group size of an integral number of servo tracks for the plurality of media surfaces; and
configuring an integral number of data tracks associated with the integral number of servo tracks for each of the plurality of media surfaces, wherein the integral number of data tracks associated with the integral number of servo tracks for one of the plurality of media surfaces differs from the integral number of data tracks associated with the integral number of servo tracks for at least one other media surface; thereby enabling:
performing at least one of a read operation and a write operation on consecutive data tracks associated with a first group on at least two of the plurality of media surfaces associated with a first group.

2. The method of claim 1 wherein the integral number of servo tracks in a group is between 50 and 500.

3. The method of claim 1 wherein the number of nominal data tracks per group ranges between 75 to 750.

4. The method of claim 1 further comprising:
configuring media zone boundaries to coincide with an integral number of groups.

5. The method of claim 4 wherein configuring media zone boundaries to coincide with an integral number of groups includes:
configuring the integral number of groups between media zone boundaries to be in the range of 25 to 200 groups.

6. The method of claim 1, wherein configuring an integral number of data tracks associated with the integral number of servo tracks for each of the plurality of media surfaces, comprises:
(a) writing a first data by a first write head to a first data track on a first media surface, the first write head adapted to write data to the first surface;
(b) reading the first data by a first read head, the first read head adapted to read data from the first surface;
(c) determining a writing characteristic of the first write head from the first data; and
(d) configuring a first integral number of data tracks to correspond to an integral number of servo tracks for the first media surface, the first integral number of data tracks derived from the writing characteristic.

7. The method of claim 6 further comprising:
(e) repeating steps (a) through (d) for the remainder of the plurality of media surfaces, each media surface adapted to be accessed by a corresponding writing head and reading head.

8. The method of claim 7 further comprising:
reducing the integral number of data tracks corresponding to the integral number of servo tracks for each of the plurality of media surfaces such that the total capacity of the electronic storage device is within a margin above a target capacity.

9. The method of claim 6 wherein the writing characteristic includes the writing head width.

10. A method for accessing data on an electronic storage device having a plurality of media surfaces, at least one of the plurality of media surfaces having a different data track pitch then at least one other media surface, the method comprising:
(a) accessing a first number of consecutive data tracks in a first radial direction on a first of the plurality of media surfaces, the accessing a first number of consecutive data tracks beginning at a first start point located a first distance in a radial direction away from the center of the first media surface and ending at a first end point located a second distance in a radial direction away from the center of the first media surface, the first number of consecutive data tracks corresponding to an integral number of groups, wherein each group corresponds to an integral number of servo tracks; and
(b) accessing a second number of consecutive data tracks in a second radial direction on a second of the plurality of media surfaces, the second radial direction configured to be opposite to the first radial direction, the accessing a second number of consecutive data tracks beginning at a second start point located about the second distance in a radial direction away from the center of the second media surface and ending at a second end point located about the first distance in a radial direction away from the center of the second media surface, the first start point generally aligned with the second end point, the first end point generally aligned with second start point, the second number of consecutive data tracks differing from the first number of consecutive data tracks, the second of the plurality of surfaces configured to be adjacent to the first of the plurality of surfaces.

11. The method of claim 10 further comprising:
(c) repeating (a) and (b) for the remaining of the plurality of media surfaces.

12. The method of claim 10 further comprising:
(c) accessing the second number of consecutive data tracks in a third radial direction on the second of the plurality of media surfaces, the accessing a second number of consecutive data tracks beginning at a third start point located a third distance in a radial direction away from the center of the second media surface and ending at a fourth end point located a fourth distance in a radial direction away from the center of the second media surface; and
(b) accessing the first number of consecutive data tracks in a fourth radial direction on the first of the plurality of media surfaces, the fourth radial direction configured to be opposite to the third radial direction, the accessing the first number of consecutive data tracks beginning at a fourth start point located the fourth distance in a radial direction away from the center of the second media surface and ending at the third end point located the third distance in a radial direction away from the center of the first media surface, the fourth start point generally aligned with the third end point, the fourth end point generally aligned with third start point.

13. A method for implementing an electronic storage device comprising:
providing a plurality of media surfaces, the media surfaces having a varying data track pitch; and
configuring a plurality of groups, each group having a group size corresponding to an integral number of servo tracks for the plurality of media surfaces, wherein an integral number of data tracks is associated with the integral number of servo tracks for each of the plurality of media surfaces, wherein the integral number of data tracks associated with the integral number of servo tracks for one of the plurality of media surfaces differs from the integral number of data tracks associated with the integral number of servo tracks for at least one other media surface; thereby enabling:
performing at least one of a read operation and a write operation on consecutive data tracks associated with a first group on at least two of the plurality of media surfaces associated with a first group.

14. The method of claim 13 wherein the integral number of servo tracks in a group is between 50 and 500.

15. The method of claim 13 further comprising configuring a number of groups to coincide with media zone boundaries on media surfaces.

16. The method of claim 15 wherein configuring a number of groups to coincide with media zone boundaries on media surfaces includes:
configuring the number of groups between media zone boundaries to be in the range of 25 to 200 groups.

17. A method for configuring a hard disk, comprising:
determining a plurality of groups of an integral number of servo tracks, each group including a like portion of servo tracks of each one of a plurality of media surfaces;
determining for each media surface of each group, an integral number of data tracks; wherein the integral number of data tracks differs for at least two media surfaces of a group; and
performing at least one of a read operation and a write operation on sequential data tracks associated with a first group on at least two of the plurality of media surfaces associated with a first group.

18. The method of claim 17, wherein performing at least one of a read operation and a write operation on sequential data tracks associated with the first group on at least two of the plurality of media surfaces associated with the first group, comprises:
performing at least one of a read operation and a write operation on sequential data tracks associated with the first group on at least two of the plurality of media surfaces associated with the first group in serpentine fashion by accessing data along a first radial direction for a first media surface with a first head and a substantially opposite radial direction for a second media surface with a second head.

* * * * *